O. COLVIN.
Bee-Hive.

No. 203,890.  Patented May 21, 1878.

WITNESSES:
A. W. Almqvist
Alex F. Roberts

INVENTOR:
O. Colvin
BY Munn & Co.
ATTORNEYS.

UNITED STATES PATENT OFFICE.

ORSON COLVIN, OF SCHOOLCRAFT, MICHIGAN.

IMPROVEMENT IN BEE-HIVES.

Specification forming part of Letters Patent No. 203,890, dated May 21, 1878; application filed December 1, 1877.

*To all whom it may concern:*

Figure 1:
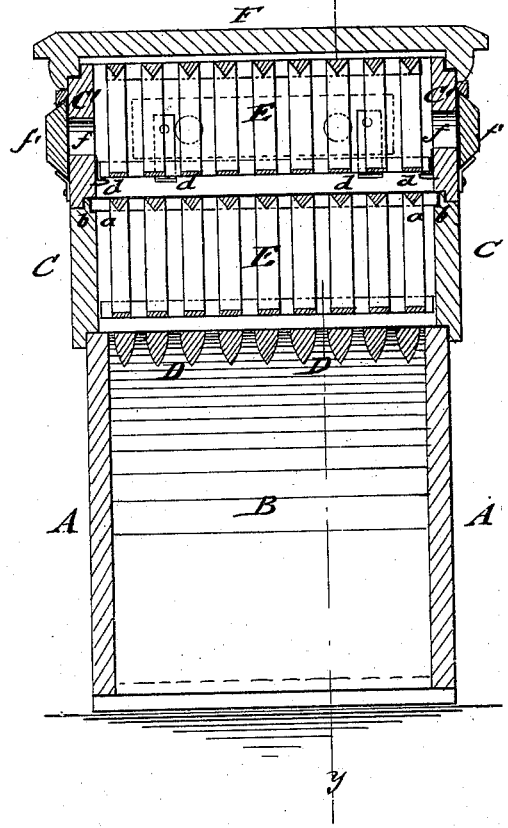
Figure 2:
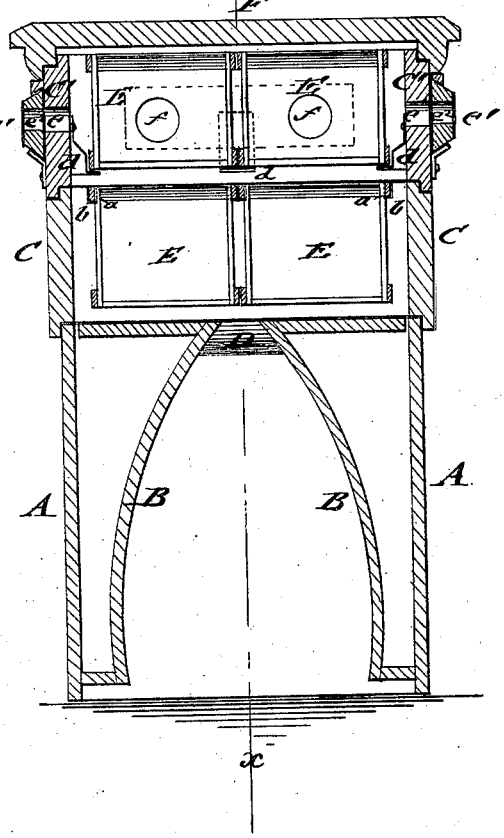

Be it known that I, ORSON COLVIN, of Schoolcraft, in the county of Kalamazoo and State of Michigan, have invented a new and Improved Bee-Hive, of which the following is a specification:

In the accompanying drawing, Figure 1 represents a vertical longitudinal section of my improved bee-hive on line $x\ x$, Fig. 2; and Fig. 2, a vertical transverse section of the same on line $y\ y$, Fig. 1.

Similar letters of reference indicate corresponding parts.

The invention is an improvement upon bee-hives for which I have already received Letters Patent.

The improvement relates particularly to the form of the brood-chamber and the comb-guides or peak-blocks secured at the top of said chamber, as hereinafter described.

The lower portion A of my improved hive contains the brood-chamber B, which has arc-shaped or concaved sides. Having observed that bees tend to build their brood-comb in an oval form, I conceived the idea that a hive having concave sides or sides converging gradually toward the top, and having comb-guides arranged at the top of the brood-chamber, so as to connect the concave sides and span the space between them, would conform more to the instincts or natural tendencies of the bee, and result in an increased production of surplus honey.

Upon practical test I found the theory correct, and the yield of surplus honey even greater than I had anticipated. The rationale is thus explained: If the brood-chamber is rectangular, the bees will fill it with comb, and then fill the corners of the several comb-cards with honey, but will nevertheless build the brood-comb oval.

By constructing the brood-chamber with concave sides the square corners are cut off or dispensed with, and hence the bees will deposit in the surplus-honey boxes placed above the brood-chamber such amount of honey as they would otherwise have deposited in the corners of the comb-cards built in a rectangular brood-chamber.

I have also observed that if bees, when heavily loaded with honey, cannot pass readily from the brood-chamber to the surplus-honey boxes, they will drop or travel back and deposit honey in the brood-cells, which often contracts the brood-nest to such an extent that there is not room enough left for brooding to keep up the strength of the colony.

By providing a hive with concave sides the honey-laden bees have a comparatively easy ascent from the brood-chamber to the surplus-honey boxes, and will therefore seldom return to the brood-chamber to deposit honey therein, as they tend to do when the walls of the chamber are differently constructed.

The comb-guides or peak-blocks D have convex sides. I have found by practical test that bees will build their comb-cards more nearly straight when such guides are employed, and will not build so far up on the sides of the guides, and hence not obstruct the passage between them, as when guides having straight or flat beveled sides are employed. In fact, the convex guides are indispensable to the production of straight worker-bee brood-comb and to uniformity of thickness of the same.

The surplus-honey racks E are supported in the top section C, that is seated by a rabbeted shoulder on the lower section A, by means of end projections $a$ of their top slats resting in recesses $b\ b$ of the top section C, or on metallic or other brackets, $d$, as shown in the second top section C', fitted tightly on top of the lower section C.

Between the surplus-honey racks and the walls of the top sections of the hive are formed spaces, into which the bees have convenient access, so as to afford complete protection against insects getting in around the racks.

The top sections C C' are provided at opposite sides with ventilating-holes $e$, which are closed by outer slides $e^1$ with wire-gauze-covered openings $e^2$. The remaining sides are provided with glass-covered openings or windows $f$, which are closed by outer slides $f'$, and opened from time to time for the inspection of the surplus-honey racks. The ventilating-openings may, by means of the slides, be partly or entirely opened or closed, according to the degree of ventilation desired to be given to the interior of the hive.

In this hive construction any number of extra honey-racks may be arranged on the top of the lower ones by adding another section and racks, the uppermost section being closed by a tightly-fitting cover or lid, F. The extra honey-racks prevent not only the carrying of honey into the brood-department while the water of the honey in one set of racks is evaporating, preparatory to sealing, but also the retarding of the brooding of the bees in the same proportion, so as to be instrumental in obtaining a regular brooding and a greater yield of honey. The ventilation through the sides of the top sections may be arranged in warm climates in every section, so as to admit the escape of the hot inside air, while for the northern latitudes only the uppermost section requires ventilators.

Having thus described my invention, I claim as new and desire to secure by Letters Patent—

1. The brood-chamber having concave or arc-shaped sides, as shown and described, for the purpose specified.

2. The comb-guides or peak-blocks of the brood-chamber, having convex sides, as shown and described.

ORSON COLVIN.

Witnesses:
J. A. OWEN,
SAMUEL HAWKINS.